United States Patent
Khan

(10) Patent No.: US 11,881,041 B2
(45) Date of Patent: Jan. 23, 2024

(54) AUTOMATED CATEGORIZATION AND PROCESSING OF DOCUMENT IMAGES OF VARYING DEGREES OF QUALITY

(71) Applicant: BANK OF AMERICA CORPORATION, Charlotte, NC (US)

(72) Inventor: Aftab Khan, Richardson, TX (US)

(73) Assignee: Bank of America Corporation, Charlotte, NC (US)

( * ) Notice: Subject to any disclaimer, the term of this patent is extended or adjusted under 35 U.S.C. 154(b) by 327 days.

(21) Appl. No.: 17/465,547

(22) Filed: Sep. 2, 2021

(65) Prior Publication Data

US 2023/0061725 A1     Mar. 2, 2023

(51) Int. Cl.

| | |
|---|---|
| *G06V 30/12* | (2022.01) |
| *G06N 20/00* | (2019.01) |
| *G06F 40/284* | (2020.01) |
| *G06F 40/242* | (2020.01) |
| *G06V 30/413* | (2022.01) |
| *G06F 18/214* | (2023.01) |
| *G06F 18/21* | (2023.01) |

(52) U.S. Cl.
CPC .......... *G06V 30/133* (2022.01); *G06F 18/214* (2023.01); *G06F 18/217* (2023.01); *G06F 40/242* (2020.01); *G06F 40/284* (2020.01); *G06N 20/00* (2019.01); *G06V 30/413* (2022.01)

(58) Field of Classification Search
CPC .... G06V 30/133; G06V 30/413; G06N 20/00; G06F 40/284; G06F 40/242; G06F 18/217; G06F 18/214
See application file for complete search history.

(56) References Cited

U.S. PATENT DOCUMENTS

| | | | |
|---|---|---|---|
| 7,570,816 B2 | 8/2009 | Bargeron et al. | |
| 7,574,409 B2 | 8/2009 | Patinkin | |
| 7,644,052 B1 | 1/2010 | Chang et al. | |
| (Continued) | | | |

FOREIGN PATENT DOCUMENTS

| | | | |
|---|---|---|---|
| EP | 0708412 A2 | 4/1996 | |
| WO | WO-2022183138 A2 * | 9/2022 | |

OTHER PUBLICATIONS

Van Nguyen; Automated Categorization and Assembly of Low-Quality Images Into Electronic Documents; U.S. Appl. No. 17/306,495, filed May 3, 2021.

(Continued)

*Primary Examiner* — Shefali D Goradia

(57) ABSTRACT

An apparatus includes a memory and a processor. The memory stores a dictionary and a machine learning algorithm trained to classify text. The processor receives an image of a page, converts the image into a set of text, and identifies a plurality of tokens within the text. Each token includes one or more contiguous characters that are both preceded and followed by whitespace within the text. The processor identifies invalid tokens by removing tokens of the plurality of tokens that correspond to words of the dictionary. The processor calculates, based on a ratio of a total number of valid tokens to a total number of tokens, a score. In response to determining that the score is greater than a threshold, the processor applies the machine learning algorithm to classify the text into a category and stores the image and/or text in a database according to the category.

20 Claims, 4 Drawing Sheets

(56) References Cited

U.S. PATENT DOCUMENTS

| | | |
|---|---|---|
| 7,813,822 B1 | 10/2010 | Hoffberg |
| 7,945,101 B2 | 5/2011 | Chen et al. |
| 8,165,974 B2 | 4/2012 | Privault et al. |
| 8,239,335 B2 | 8/2012 | Schmidtler et al. |
| 8,374,977 B2 | 2/2013 | Schmidtler et al. |
| 8,442,319 B2 | 5/2013 | Sarkar et al. |
| 8,520,941 B2 | 8/2013 | Nafarieh et al. |
| 8,548,828 B1 | 10/2013 | Longmire |
| 8,719,197 B2 | 5/2014 | Schmidtler et al. |
| 9,836,455 B2 | 12/2017 | Martens et al. |
| 9,923,931 B1 | 3/2018 | Wagster et al. |
| 10,438,354 B2 | 10/2019 | Hsieh et al. |
| 10,467,464 B2 | 11/2019 | Chen et al. |
| 10,497,274 B2* | 12/2019 | Nishihara ............. G06F 40/174 |
| 10,503,971 B1 | 12/2019 | Dang et al. |
| 10,529,029 B2 | 1/2020 | Okazaki |
| 10,599,885 B2 | 3/2020 | Galitsky |
| 10,628,943 B2 | 4/2020 | Hsieh et al. |
| 10,657,158 B2 | 5/2020 | Sheng et al. |
| 10,783,634 B2 | 9/2020 | Nye et al. |
| 10,825,168 B2 | 11/2020 | Tegzes et al. |
| 10,896,352 B2 | 1/2021 | Hsieh et al. |
| 10,949,951 B2 | 3/2021 | Tang et al. |
| 10,963,503 B2 | 3/2021 | Skiles et al. |
| 10,999,468 B2* | 5/2021 | Nakamura ......... H04N 1/32128 |
| 11,003,988 B2 | 5/2021 | Hsieh et al. |
| 11,030,491 B2 | 6/2021 | Okazaki |
| 11,462,037 B2* | 10/2022 | Gehler ................... G06N 20/00 |
| 11,481,562 B2 | 10/2022 | Xiong et al. |
| 11,704,352 B2* | 7/2023 | Nguyen ............. G06F 18/2178 |
| | | 707/737 |
| 2003/0149692 A1 | 8/2003 | Mitchell |
| 2008/0086432 A1 | 4/2008 | Schmidtler et al. |
| 2009/0116736 A1 | 5/2009 | Neogi et al. |
| 2011/0249905 A1 | 10/2011 | Singh et al. |
| 2011/0258150 A1 | 10/2011 | Neogi et al. |
| 2012/0117082 A1* | 5/2012 | Koperda .......... G06F 16/24578 |
| | | 707/E17.084 |
| 2017/0270115 A1 | 9/2017 | Cormack et al. |
| 2018/0197105 A1 | 7/2018 | Luo et al. |
| 2018/0365593 A1 | 12/2018 | Galitsky |
| 2019/0147103 A1 | 5/2019 | Bhowan et al. |
| 2019/0180097 A1* | 6/2019 | Ferguson ................. G06N 3/02 |
| 2020/0019769 A1 | 1/2020 | Leibovitz et al. |
| 2020/0218719 A1 | 7/2020 | Eifert et al. |
| 2021/0026874 A1 | 1/2021 | Ikeda |

OTHER PUBLICATIONS

Van Nguyen; Automated Categorization and Assembly of Low-Quality Images Into Electronic Documents; U.S. Appl. No. 17/306,374, filed May 3, 2021.

* cited by examiner

AUTOMATED CATEGORIZATION AND PROCESSING OF DOCUMENT IMAGES OF VARYING DEGREES OF QUALITY

TECHNICAL FIELD

The present disclosure relates generally to image analysis, and more particularly, to automated categorization and processing of document images of varying degrees of quality.

BACKGROUND

Organizations are increasingly moving in a "paperless" direction. For example, organizations often request that their members submit documents electronically (by email, uploading to a website, etc.), rather than sending physical copies of the documents in the mail. Once received, each document is typically identified and stored in an appropriate electronic location. Certain types of information may also be extracted from the documents. While organizations often rely on individuals to perform these categorization, storage, and information extraction processes, manually reviewing each document may be impractical especially when large volumes of electronic documents are received.

SUMMARY

This disclosure contemplates a tool for use in processing electronically received documents of varying degrees of quality, in a computationally efficient manner. The tool is designed to operate either directly on electronically received images of pages of physical documents (in which case the tool first uses an optical character recognition (OCR) algorithm to convert each image into a set of text) or in conjunction with a system that performs such OCR conversions. After an image of a page of a physical document has been converted into a set of text, the tool calculates a "clean score" for the text. The clean score is designed to provide a measure of the quality of the text generated by the OCR conversion process. In particular, the score provides a measure of the quantity of errors in the text, which are generated during the OCR conversion process due to the presence of noise in the image. In certain embodiments, the score is designed such that a high score indicates that the text includes proportionally few errors while a low score indicates that the text includes a proportionally large number of errors. The tool uses the score to determine how to process the set of text—if the score is above a certain threshold, the tool uses one or more machine learning algorithms to automatically process the text (e.g., categorize the text, extract information from the text, etc.), whereas, in certain embodiments, if the score is below the threshold, the tool does not automatically process the text. Instead, the tool may send the associated image to a queue for manual processing, or reject the image altogether and transmit a request to the device that submitted the image requesting that a higher quality image be submitted instead. In this manner, certain embodiments conserve computational resources by avoiding the waste of resources associated with attempting to automatically process poor quality images/associated OCR text and obtaining unusable/erroneous data as a result. An embodiment of the tool is described below.

According to an embodiment, an apparatus includes a memory and a hardware processor communicatively coupled to the memory. The memory stores an optical character recognition (OCR) algorithm, a first machine learning algorithm, and a dictionary of words. The first machine learning algorithm is trained to classify a set of text into a category of a set of categories. The hardware processor receives a first image of a page of a physical document. The processor also converts, by executing the OCR algorithm, the first image into a first set of text that includes characters and whitespaces. The processor additionally identifies a plurality of tokens within the first set of text. Each token of the plurality of tokens includes one or more contiguous characters, where, within the first set of text, the one or more contiguous characters are preceded by whitespace and followed by whitespace. For each token of the plurality of tokens, the processor removes any valid punctuation from the token, wherein the valid punctuation comprises at least one of one or more contiguous punctuation marks at a beginning of the token, and one or more contiguous punctuation marks at an end of the token. The processor also identifies a set of invalid tokens from the plurality of tokens. Identifying the set of invalid tokens includes removing each token of the plurality of tokens that corresponds to a word of the dictionary of words. The processor also determines, based on a total number of invalid tokens of the set of invalid tokens and a total number of tokens of the plurality of tokens, a total number of valid tokens of the plurality of tokens. The processor additionally calculates, based on a ratio of the total number of valid tokens to the total number of tokens of the plurality of tokens, a score for the first set of text. The processor further determines that the score for the first set of text is greater than a threshold. In response to determining that the score for the first set of text is greater than the threshold, the processor applies the first machine learning algorithm to the first set of text to classify the first set of text into a first category of the set of categories. The processor additionally stores, according to the first category, at least one of the first image and the first set of text in a database.

Certain embodiments may provide one or more technical advantages. As an example, an embodiment conserves processing and networking resources by automatically assessing the quality of each document that it receives, and using this assessment to determine how to process the document. In particular, in response to receiving an electronic image of a document, the tool applies an OCR algorithm to the image, and generates a score for the resulting OCR-generated text. If the score is below a given threshold (indicative of a low-quality/noisy image for which a large number of errors are present in the resulting OCR-generated text), the tool rejects the document and requests submission of a higher-quality image. Because the tool relies on computationally inexpensive operations to calculate the image quality score, certain embodiments conserve significant processing resources by avoiding the waste of processing resources associated with automatically processing low-quality images, for which there is a low probability that the results generated by such automatic processing will be accurate/reliable. As another example, an embodiment conserves processing resources by reducing the computational time needed to train a machine learning algorithm, by forming a training set that includes only electronic documents that are of at least a minimum quality level (as determined based on the image quality scores calculated for the documents). As a further example, an embodiment conserves processing resources when determining whether text generated by an OCR algorithm includes valid words, by storing a dictionary of words in memory, where each word is associated with a specific memory address determined based on a hash of the word. In such embodiments, determining whether an OCR-generated "word" is a valid dictionary word simply involves (1) performing a hash of the OCR word to obtain a memory address, (2) identifying the dictionary word (if any) stored at that memory address, and (3) determining whether the OCR word matches the stored dictionary word. This is in contrast to conventional, computationally intensive methods for determining whether a given OCR-generated word is included in a dictionary of words, which involve comparing the OCR word to each dictionary word until either a match is found, or comparisons to all of the dictionary words have been performed.

The tool described in the present disclosure may particularly be integrated into a practical application of a document management and processing tool that can automatically categorize and index documents so that certain types of information can be efficiently extracted from the documents for later use. Such a tool may be particularly advantageous in the "big data" context, in which the volume, rate of receipt, and variety of big data poses particular processing challenges. In particular, a large amount of computational resources may be wasted by the failure to detect low quality documents in datasets that are used to generate big data analytics. Accordingly, certain embodiments provide a big data analytics tool that conserves computational resources by efficiently identifying low quality documents and removing them from the big data, prior to processing the data, thereby helping to ensure that the results generated by the tool are accurate.

The tool may also provide a practical application by improving the quality of documents available in a publicly accessible database. In particular, the tool may be used to automatically assess the quality of each document submitted for inclusion in the database, and to reject those documents that are not of a sufficient quality. In this manner, certain embodiments may conserve significant computational resources. For example, certain embodiments may conserve significant networking resources that would otherwise be expended by a remote user accessing the database to view/obtain one or more documents, only to discover that the documents are not of a suitable quality for the user's purposes, and the user searching elsewhere for such documents. Certain embodiments may also conserve significant processing and bandwidth resources that would otherwise be expended by a remote user downloading documents from the remote database and providing them as input to a computing system, only to discover that the results generated by the computing system are not reliable, because the input documents were not of a high enough quality. By helping to ensure that the documents stored in the database are of at least a minimum quality, certain embodiments may additionally conserve significant processing resources that would otherwise be associated with multiple external users implementing their own quality assessment systems to assess the quality of any documents downloaded from the database, prior to using such documents within their own systems.

As another example, the tool described in the present disclosure may additionally provide a practical application of a machine learning training tool that is designed to train one or more machine learning algorithms using images and/or sets of text obtained by applying an OCR algorithm to such images. In particular, because many such machine learning algorithms are designed under the assumption that the images on which the algorithms operate do not include any noise, the presence of significant noise in the training data may lead to longer training times and/or reduced accuracy as compared with training data that does not include such noise. Accordingly, by providing a quantitative measure to assess the quality of a given image, prior to including the image in a machine learning training dataset, and only including those images that are of a sufficient quality level in the dataset, certain embodiments of the tool may conserve significant amounts of processing resources. In particular, certain embodiments may result in reduced training times, and improved performance. Furthermore, certain embodiments of the machine learning training tool may be used to train machine learning algorithms that have been specifically designed to operate on images that include significant amounts of noise. In such embodiments, the tool may be used to generate training datasets that include images with at least a minimum level of noise (as determined based on the quantitative quality measure the tool calculates for the image). In certain embodiments, training the machine learning algorithms using such training sets may also result in improved accuracy and reduced training times.

Certain embodiments may include none, some, or all of the above technical advantages. One or more other technical advantages may be readily apparent to one skilled in the art form the figures, descriptions, and claims included herein.

BRIEF DESCRIPTION OF THE DRAWINGS

For a more complete understanding of the present disclosure, reference is now made to the following description, taken in conjunction with the accompanying drawings, in which:

FIGS. 2A and 2B present an example image of a document, along with the OCR text generated for the example image;

DETAILED DESCRIPTION

Embodiments of the present disclosure and its advantages may be understood by referring to FIGS. 1 through 4 of the drawings, like numerals being used for like and corresponding parts of the various drawings.

I. System Overview

Figure 1:
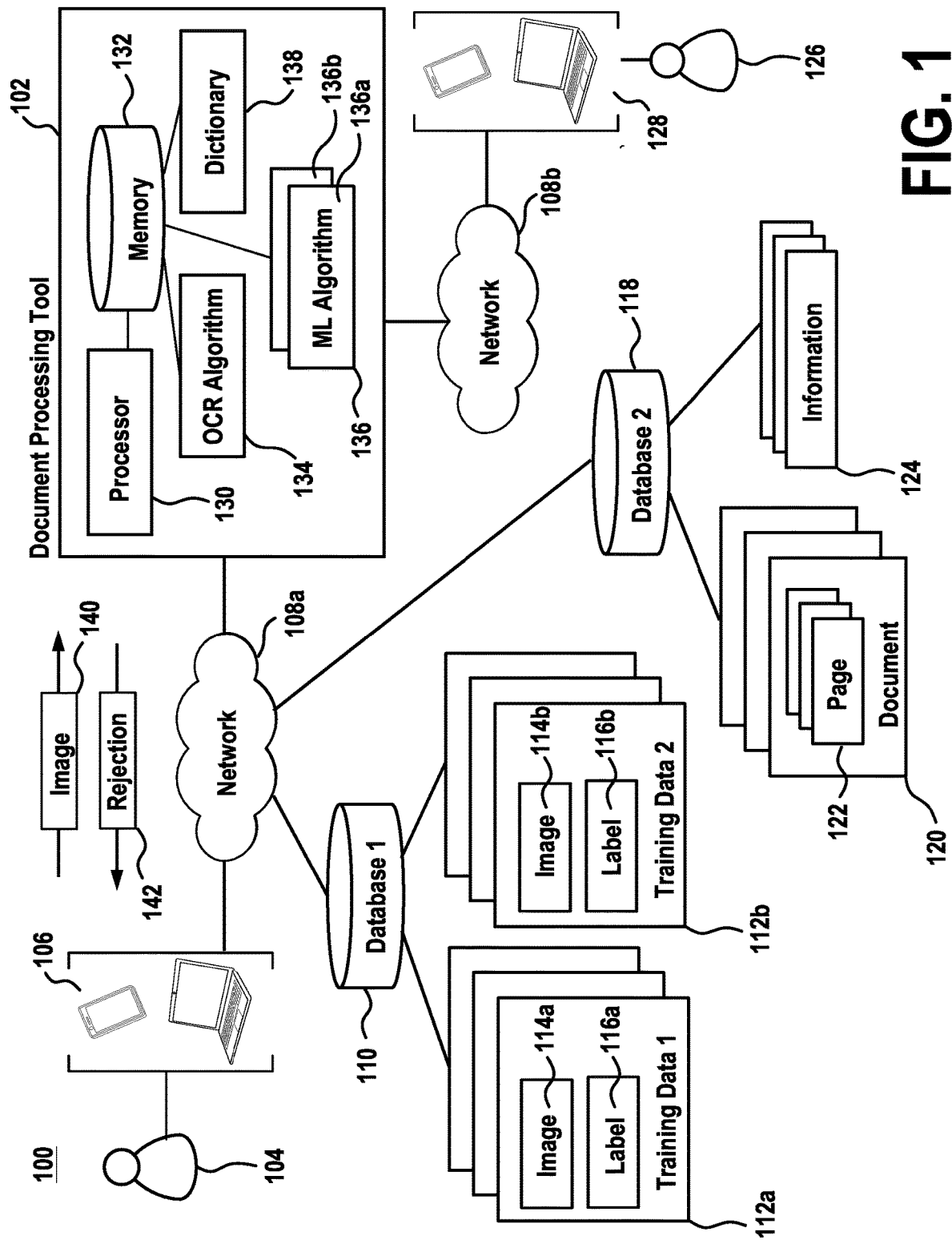
FIG. 1 illustrates an example document processing system.

FIG. 1 illustrates an example document processing system 100 that includes document processing tool 102, user(s) 104, device(s) 106, network(s) 108*a/b*, first database 110, second database 118, system administrator 126, and administrator device 128. Generally, document processing tool 102 is configured to: (1) receive images 140 of pages of physical documents; (2) apply OCR algorithm 134 to each image 140 to convert the image into a set of text; (3) split the set of text into a set of tokens, where each token corresponds to a set of one or more contiguous characters delimited by whitespace; (4) generate a "clean score" for the image/set of text, by calculating the ratio of the number of valid tokens (as determined based at least on the contents of dictionary 138) to the total number of all tokens within the set of tokens, and provides a measure of the quality of image 140/the text generated from image 140; and (5) process the image based on the value of the clean score. Details of the manner by which document processing tool 102 performs these functions are presented below and in the discussion of FIGS. 3 and 4.

Devices 106 are used by users 104 located on network 108a to communicate with document processing tool 102. In particular, users 104 use devices 106 to transmit images 140 to document processing tool 102. In certain embodiments, users 104 may also use devices 106 to receive rejections 142 from document processing tool 102, indicating that one or more images 140 have been rejected by the tool. For example, tool 102 may transmit rejection 142 to device 106 in response to determining that the clean score for image 140, corresponding to an image of a certain page of a document, is less than a prescribed threshold. In response to receiving rejection 142, user 104 may use device 106 to send a new, higher quality image of the document page.

Each image 140 corresponds to an electronically generated image of a page of a physical document. For example, an image 140 may be of a page of a book, a letter, a notice, a receipt, a contract, a passport, or any other suitable physical document. Images 140 may include handwritten, typewritten, or printed text. Images 140 may be of pages that include only text, or a combination of text and graphics. In some embodiments, images 140 may be of pages that include text corresponding to identification information associated with users 104, or other individuals to whom the associated physical documents pertain. For example, an image 140 may include a name, an address, a phone number, a birthdate, a driver's license number, a passport number, an employee identification number, a customer identification number, and/or any other suitable identifying information.

Images 140 may be generated in any suitable manner. For example, in certain embodiments, images 140 may be generated by scanning the pages of a physical document, by taking digital photographs of a physical document, by faxing a physical document, and/or in any other suitable manner. In certain embodiments, an image 140 may correspond to an electronic copy of a previously reproduced page of a physical document. For example, image 140 may be generated by scanning a photocopy, a fax, a photograph, and/or any other suitable reproduction of a page of a physical document. Images 140 may be PDF images, Bitmap images, JPEG images, TIFF images, PNG images, GIF images, and/or any other suitable format of images.

Images 140 may be of varying levels of quality. For example, in certain embodiments, images 140 may include high quality images of pristine physical documents (e.g., documents without any creases, marks, etc.). In some embodiments, images 140 may include low quality images that include significant amounts of noise. This noise may correspond to defects in the physical document (e.g., creases, tears, stains, bleed-through of the content on the opposite side of the page, handwriting in the margin of the page, etc.), non-textual features of the physical document (e.g., hole punches, ruled lines, background color, etc.), and/or noise generated during the image capturing process (or any intermediate reproduction of the page of the physical document) and/or during transmission of the image. For example, the noise may correspond to uneven contrast in the image, salt-and-pepper noise, noise associated with document skew while scanning, show through effects, interfering strokes, and/or any other type of noise that may be generated in the image. In particular, as used throughout this disclosure, noise refers to any feature of an image 140 that may interfere with the ability of a conventional optical character recognition (OCR) algorithm to accurately extract text from the image.

Users 104 may use devices 106 to transmit images 140 to document processing tool 102 in any suitable manner. For example, in certain embodiments, users 104 transmit images 140 using email. In some embodiments, document processing tool 102 (or another component of system 100) may host a webpage through which users 104 may upload images 140. For example, the webpage may include a graphical user interface (GUI) that includes a button, selectable by a user 104, to begin the process of uploading one or more images 140 to document processing tool 102. In response to selecting the button, the GUI may enable user 104 to navigate to one or more images 140 stored on device 106, and select those images for upload to document processing tool 102. In certain embodiments, the GUI may also include one or more fields for input of information associated with images 140. For example, the GUI may include a field through which user 104 may input his/her name or other identifying information.

Devices 106 may transmit images 140 belonging to the same physical document in a single communication, or in a stream of communications. For example, device 106 may transmit a first image 140 corresponding to a first page of a physical document in a first transmission, and a second image 140 corresponding to the second page of the physical document in a second transmission. Alternatively, device 106 may transmit both first image 140 and second image 140 in the same transmission.

Devices 106 include any appropriate device from transmitting images 140 to document processing tool 102. In some embodiments, devices 106 include devices for capturing images 140 in addition to transmitting the images to document processing tool 102. As an example, device 106 may be a scanner equipped with email functionality, such that user 104 may use the scanner to scan a page of a physical document and then email the resulting image 140 to document processing tool 102. As another example, device 106 may be a mobile phone equipped with a camera, which user 104 may use to capture an image 140 of a page of a physical document. In some embodiments, devices 106 include devices for receiving images 140 captured by other image capturing equipment and then transmitting the received images 140 to document processing tool 102. For example, device 106 may be a computer or other device that is connected to a scanner. In general, devices 106 include any appropriate device for communicating with components of system 100 over network 108a. For example, device 106 may be a telephone, a mobile phone, a computer, a laptop, a wireless or cellular telephone, a tablet, a server, an IoT device, and/or an automated assistant, among others. This disclosure contemplates devices 106 being any appropriate device for sending and receiving communications over network 108a. Device 106 may also include a user interface, such as a display, a microphone, keypad, or other appropriate terminal equipment usable by user 104. In some embodiments, an application executed by a processor of device 106 may perform the functions described herein.

Network 108a facilitates communication between devices 106 and document processing tool 102. Network 108b facilities communication between administrator devices 128 and document processing tool 102. In certain embodiments, network 108a and network 108b correspond to the same network. In some embodiments, network 108a and network 108b may correspond to different networks. For example, network 108a may correspond to an external network (e.g., the Internet), while network 108b may correspond to an internal network (e.g., an internal network operated by the organization to which document processing tool 102 belongs).

This disclosure contemplates network(s) 108a/b being any suitable network operable to facilitate communication between the components of system 100. Network(s) 108a/b may include any interconnecting system capable of transmitting audio, video, signals, data, messages, or any combination of the preceding. Network(s) 108a/b may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

First database 110 corresponds to any storage system that is configured to store one or more sets of training data 112. While illustrated in FIG. 1 as storing two sets of training data—first set of training data 112a and second set of training data 112b, this disclosure contemplates that first database 110 may store any suitable number of sets of training data 112. Each set of training data 112a/b may be used for training one or more machine learning algorithms 136. For example, first set of training data 112a may be used to train first machine learning algorithm 136a, and second set of training data 112b may be used to train second machine learning algorithm 136b. Each set of training data 112a/b includes an image 114a/b, and, in embodiments in which the training data is used to train a supervised machine learning algorithm, a label 116a/b associated with each image 114a/b. For example, where training data 112a is used to train a machine learning classification algorithm, each label 116a may label the category into which image 114a should be classified. While FIG. 1 illustrates training data 112a/b as including images 114a/b, this disclosure contemplates that in certain embodiments, training data 112a/b may include sets of text instead of images 114a/b, where each set of text is associated with a given image 114a/b, and corresponds to OCR-generated text that has been generated by applying OCR algorithm 134 to the associated image 114a/b In certain embodiments, the images 114a/b (and/or associated sets of text) stored in each set of training data 112a/b are associated with clean scores that are within a given range. For example, the images 114a stored in first set of training data 112a may be associated with clean scores that are greater than a set threshold, while the images 114b stored in second set of training data 112b may be associated with clean scores that are less than the set threshold. Accordingly, in certain embodiments, first set of training data 112a may be used to train a machine learning algorithm 136a that is designed to operate on OCR-generated text obtained from high quality images, while second set of training data 112b may be used to train a machine learning algorithm 136b that is designed to operate on OCR-generated text obtained from low quality images. Details of the manner by which document processing tool 102 generates clean scores are described in further detail below, in the discussion of FIG. 3.

Second database 118 corresponds to any storage system that is configured to store a set of electronic documents 120, each of which includes one or more pages 122. Each electronic document 120 is an electronic version of a corresponding physical document. In certain embodiments, page(s) 122 of electronic document 120 correspond to the images 140 of the pages of the corresponding physical document that were received by document processing tool 102. In some embodiments, page(s) 122 may correspond to text that was extracted from the images 140 of the pages of the corresponding physical document.

In certain embodiments, second database 118 may also store information 124. Information 124 corresponds to data extracted from images 140. For example, in response to receiving an image 140, and using OCR algorithm 134 to convert image 140 into a set of text, one or more machine learning algorithms 126 may be applied to the set of text, to extract certain information 124 from the text. In response to extracting information 124 from the OCR-generated text, document processing tool 102 may store the information 124 in second database 118. Information 124 may include any suitable information that may be extracted from a set of text generated from image 140. For example, information 124 may include names, dates, identification numbers, and/or any other suitable information.

As illustrated in FIG. 1, document processing tool 102 includes processor 130 and memory 132. This disclosure contemplates processor 130 and memory 132 being configured to perform any of the functions of document processing tool 102 described herein. For example, processor 130 may execute instructions stored in memory 132 to perform any of the functions described herein. In general, document processing tool 102 is configured to: (1) receive images 140 transmitted by users 104; (2) apply optical character recognition (OCR) algorithm 134 to each image 140 to convert the image into a set of text; (3) generate a clean score for image 140, based on the proportional quantity of errors present in the OCR-generated text; and (4) process image 140 based on the generated clean score. The manner in which document processing tool 102 performs these functions is described in further detail below, in the discussion of FIGS. 3 and 4.

Processor 130 is any electronic circuitry, including, but not limited to central processing unit(s) (CPUs), graphics processing unit(s) (GPUs), microprocessors, application specific integrated circuits (ASIC), application specific instruction set processor (ASIP), and/or state machines, that communicatively couples to memory 132 and controls the operation of document processing tool 102. Processor 130 may be 8-bit, 16-bit, 32-bit, 64-bit or of any other suitable architecture. Processor 130 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 130 may include other hardware and software that operates to control and process information. Processor 130 executes software stored on memory to perform any of the functions described herein. Processor 130 controls the operation and administration of document processing tool 102 by processing information received from device(s) 106, network(s) 108a/b, first database 110, second database 118, administrator device 128, and/or memory 132. Processor 130 may be a programmable logic device, a microcontroller, a microprocessor, any suitable processing device, or any suitable combination of the preceding. Processor 130 is not limited to a single processing device and may encompass multiple processing devices. For example, in certain embodiments, a first processor 130 may be configured to apply OCR algorithm 134 to received images 140, to convert the images into sets of text, and a second processor 130 may be configured to apply machine learning algorithm(s) 136 to the OCR-generated text, to process image 140 and/or its associated OCR-generated text.

Memory 132 may store, either permanently or temporarily, data, operational software, or other information for processor 130. Memory 132 may include any one or a combination of volatile or non-volatile local or remote devices suitable for storing information. For example, memory 132 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 132, a disk, a CD, or a flash drive. In particular embodiments, the software may include an application executable by processor 130 to perform one or more of the functions described herein.

Figures 2A, 2B:
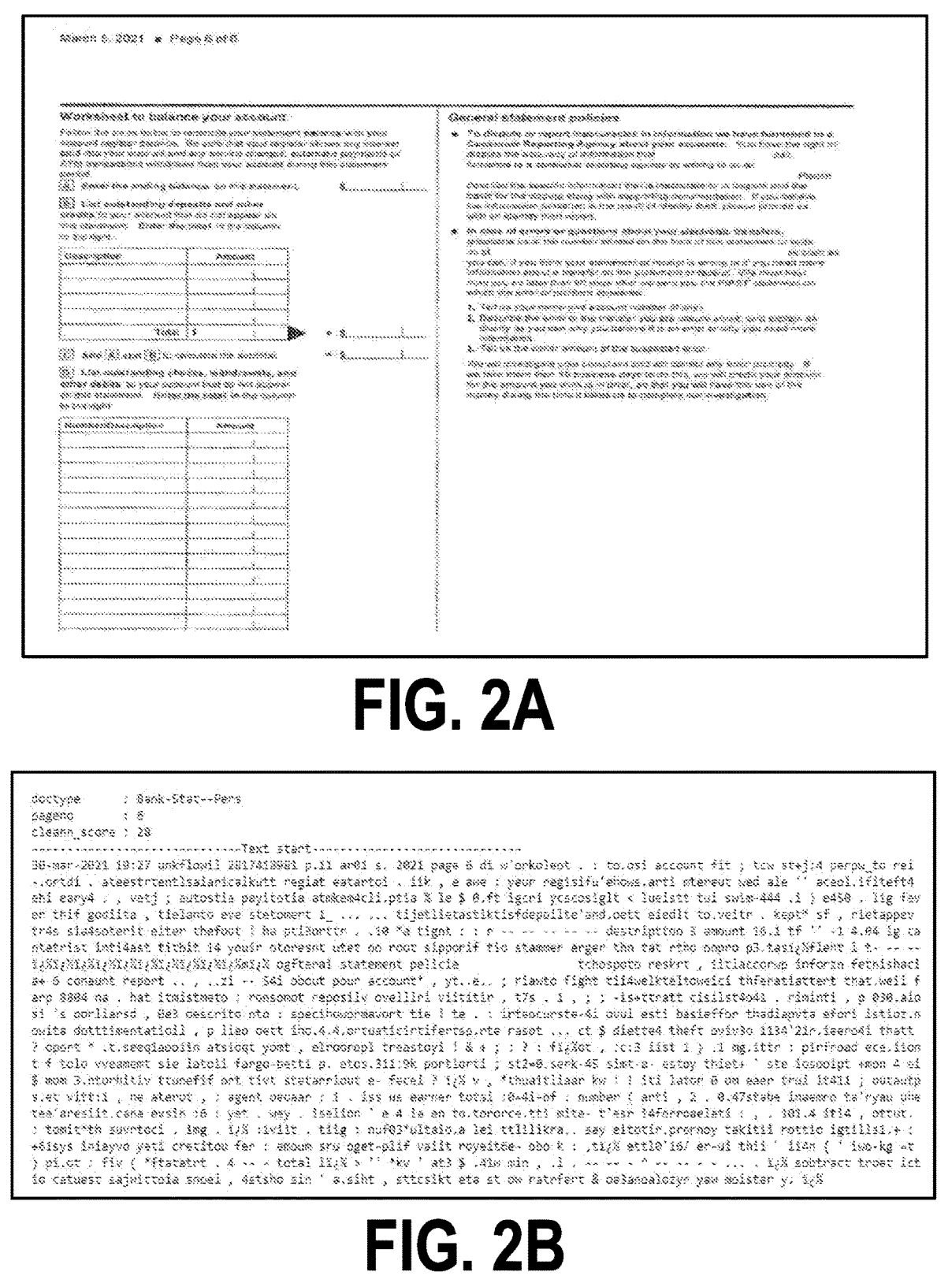

In certain embodiments, memory 132 also stores OCR algorithm 134, machine learning algorithms 136, and dictionary 138. OCR algorithm 134 is any algorithm configured to convert an image that includes handwritten, typewritten, or printed words into a set of machine-encoded text. As an example, OCR algorithm 134 may be an algorithm configured to compare each character depicted in an image to a set of characters stored in library, to find the best match. As another example, OCR algorithm 134 may be a machine learning algorithm that has been trained to identify characters depicted in images. As is typical with conventional OCR algorithms, this disclosure contemplates that OCR algorithm 134 generally performs well (e.g., accurately reproduces the text depicted in the image) when converting high quality images of pristine physical documents (e.g., documents without any creases, marks, etc.) into machine-readable text. However, OCR algorithm 134 performs less well (e.g., generates significant numbers of errors) when converting lower quality images into machine-readable text. Here, lower quality images refer to images 140 that include significant noise in the image. Such noise includes anything that interferes with the OCR algorithm's ability to accurately convert the text depicted in the image into machine-readable text. For example, the noise may correspond to defects in the physical document (e.g., creases, tears, stains, bleed-through of the content on the opposite side of the page, handwriting in the margin of the page, etc.), non-textual features of the physical document (e.g., hole punches, ruled lines, background color, etc.), and/or noise generated during the image capturing process (or any intermediate reproduction of the page of the physical document) and/or during transmission of the image. For example, the noise may correspond to uneven contrast in the image, salt-and-pepper noise, noise associated with document skew while scanning, show through effects, interfering strokes, and/or any other type of noise that may be generated in the image. FIG. 2A presents an example illustrating an image of a document that includes a significant amount of noise.

When operating on lower quality images 102, OCR algorithm 134 may generate machine-readable text that includes a significant quantity of errors, when compared with the textual content depicted in the images. These errors include any disagreements between the machine-readable text and the text depicted in the images. Such errors may include, for example, the presence of non-ascii characters, the presence of non-English words, stray letters in the machine-readable text, other than "a" or "I," the presence of letter(s) within a number, misplaced punctuation marks, erroneous dates (e.g., Jul. 42, 2020), and/or any other type of errors that may be generated during the OCR conversion process. For example, FIG. 2B presents an example of the text generated by OCR algorithm 134 from the image depicted in FIG. 2A. As can be seen, OCR algorithm 134 performs poorly on low-quality images, such as the image depicted in FIG. 2A. Because of this, a machine learning algorithm (e.g., machine learning algorithm 134) that has been trained to process the text generated by OCR algorithm 134 may generate incorrect results, thereby wasting the processing resources used in processing the text generated from image 140, and, in certain embodiments, wasting the processing resources associated with any further processing performed with the incorrect results. Accordingly, it may be desirable to assess the quality of image 140 prior to applying machine learning algorithm 136 to any OCR-generated text associated with image 140, in order to assess the likelihood that machine learning algorithm 136 will be successful (e.g., generate the correct result) when operating on the OCR-generated text. Accordingly, document processing tool 102 includes instructions stored in memory 132 for detecting errors in the OCR-generated text and for generating a clean score for image 140 based on the relative proportion of errors within the OCR-generated text. In particular, document processing tool 102 is configured to split the OCR-generated text into a set of tokens, identify valid tokens within the set (e.g., tokens that correspond to words included in dictionary 138, tokens that correspond to valid dates, tokens that correspond to numbers, etc.), and calculate a clean score based on the ratio of the number of valid tokens to the total number of tokens. Further details of the manner by which document processing tool 102 splits a set of OCR-generated text into a set of tokens and identifies valid tokens within the set are presented below, in the discussion of FIG. 3.

OCR algorithm 134 may correspond to any suitable OCR algorithm. In certain embodiments, memory 132 may store multiple different OCR algorithms 134. For example, in certain embodiments, document processing tool 102 may be configured to evaluate and compare two or more OCR algorithms 134. In such embodiments, document processing tool 102 may be configured to apply each OCR algorithm 134 to a given image 140 to generate a set of text, calculate the clean score for the text, and then compare the calculated clean scores, to compare and assess the performances of the different OCR algorithms.

Document processing tool 102 uses machine learning algorithm(s) 136 to process received images 140, based on the content of the text generated from the images by OCR algorithm 134. Machine learning algorithm(s) 136 may include any suitable machine learning algorithms for processing text. As a first example, in certain embodiments, machine learning algorithm(s) 136 include one or more machine learning classification algorithms 136a for classifying image 140 into a category of a set of document categories, based on the text depicted in the image. Machine learning algorithm 136a may be configured to classify images 140 into any suitable set of categories. For example, where images 140 correspond to images of pages of books, machine learning algorithm 136a may be configured to classify the images into a pair of document categories—"fiction," and "non-fiction." Similarly, where images 140 correspond to images of pages of non-fiction books, machine learning algorithm 136a may be configured to classify the images into a set of document categories that includes a "biography" category, a "science" category, a "history" category, a "self-help" category, etc. On the other hand, where images 140 correspond to documents associated with the purchase of a property, machine learning algorithm 136a may be configured to classify the images into a set of categories that includes an "identification document" category, a "mortgage document" category, a "title document category," and a "purchase agreement" category.

As another example of a machine learning algorithm 136 that may be implemented by document processing tool 102 to process images 140, in certain embodiments, machine learning algorithm 136b may correspond to an information extraction algorithm. For example, machine learning algorithm 136b may be configured to extract certain types of information from images 140. This disclosure contemplates that machine learning algorithm 136b may be trained to extract any type of suitable information from images 140. For example, in certain embodiments, machine learning algorithm 136b may be trained to extract identification information from images 140.

In certain embodiments, one or more machine learning algorithms 136 may include a natural language processing (NLP) algorithm that is configured to extract features from the text generated by OCR algorithm 134. The NLP algorithm may include one or more conventional NLP methods of feature extraction including, for example, bag of words, bag of N-grams, term frequency-inverse document frequency (TF-IDF), and/or any other suitable feature extraction method.

In certain embodiments, machine learning algorithms 136 may include a first machine learning algorithm 136a that has been trained to operate on high quality images 140 (e.g., images 140 for which the clean score is greater than a set threshold), and a second machine learning algorithm 136b that has been trained to operate on lower quality images 140 (e.g., images 140 for which the clean score is lower than the set threshold). This may result in improved accuracy as compared to training a single machine learning algorithm to operate on images 140 of varying degrees of quality. This may also result in reduced training times, thereby conserving computational resources.

Machine learning algorithms 136 may include any machine learning algorithm suitable for processing text. For example, machine learning algorithms 136 may include a neural network algorithm, a decision tree algorithm, a naïve Bayes algorithm, a logistic regression algorithm, a support vector machine algorithm, a random forest algorithm, and/or any other suitable machine learning algorithm. Furthermore, while this disclosure discusses the particular use of a machine learning algorithm, it should be recognized that any suitable algorithm for processing machine-readable text may be implemented in conjunction with the techniques described herein.

Memory 132 additionally may store dictionary 138. Dictionary 138 corresponds to a dictionary of words against which the text output of OCR algorithm 134 may be compared. Dictionary 138 may include any number of words. For example, in certain embodiments, dictionary 138 may include all of the words included in one or more standard, publicly available dictionaries. Dictionary 138 may include words expressed in any language. For example, dictionary 138 may include English words, French words, Italian words, and/or words expressed in any other suitable language for which documents that are associated with images 140 may be written. In certain embodiments, dictionary 138 may also include one or more strings of characters that correspond to technical and/or industry-coined terms, abbreviations, and/or any other strings of characters that the organization to which document processing tool 102 belongs recognizes as valid.

Dictionary 138 may be stored in memory 132 in any suitable manner. For example, in certain embodiments, an algorithm (e.g., a hash algorithm) is used to convert each word of dictionary 138 into a value (e.g., a hash value). The word is then stored in memory 132 at the memory address corresponding to the value. In this manner, determining that a candidate word is a member of dictionary 138 may be accomplished simply by applying the algorithm to the word to generate a memory address, and the determining whether a matching copy of the word is stored at that memory address. This may save considerable processing resources as compared to other methods that rely on multiple comparisons between the candidate word and the words stored as dictionary 138.

In certain embodiments, system 100 also includes administrator device 128. Administrator device 128 includes any device that may be operated by a system administrator 126 to communicate with components of system 100. As an example, in certain embodiments, system administrator 126 may use administrator device 128 to receive images 140, and to view those images on the display of the device. For example, in certain embodiments, the clean score generated by document processing tool 102 for a given image 140 may be below a set threshold, indicating that any results generated by machine learning algorithm(s) 136 operating on the text extracted from the image by OCR algorithm 134 may be unreliable. For instance, the set threshold may be chosen to achieve a desired level of accuracy for the machine learning algorithm 136. In particular, it may be observed that for clean scores greater than 90%, machine learning algorithm generates the correct result 98% of the time. Accordingly, for systems in which a machine learning accuracy level of 98% is desired, the threshold for the clean score below which an image 140 is sent to a system administrator 126 for manual processing may be set at 90%. Then, in response to document processing tool 102 calculating a clean score for an image 140 that is below the threshold, the tool may transmit image 140 to administrator device 128, for manual processing by system administrator 126. System administrator 126 may then view image 140 on the display of device 128, process the image (e.g., assign the image to a category of a set of categories, extract certain information from the image, etc.), and transmit the result of such processing back to document processing tool 102.

Administrator device 128 includes any appropriate device for receiving images 140, displaying received images 140, for view by system administrator 126, and transmitting results generated by the system administrator to document processing tool 102. For example, administrator device 128 may be a mobile phone, a computer, a laptop, a tablet, a server, an IoT device, and/or an automated assistant, among others. This disclosure contemplates device 128 being any appropriate device for sending and receiving communications over network(s) 108a/b and displaying images 140 for view by administrator 126. In addition to a display, device 128 may include any other suitable user interface, such as a microphone, keypad, or other appropriate terminal equipment usable by user 104. In some embodiments, an application executed by a processor of device 140 may perform the functions described herein.

Modifications, additions, or omissions may be made to the systems described herein without departing from the scope of the invention. For example, system 100 may include any number of users 104, devices 106, networks 108a/b, first databases 110, second databases 118, administrators 126, administrator devices 128, processors 130, memories 132, OCR algorithms 134, machine learning algorithms 136, and/or dictionaries 138. The components may be integrated or separated. Moreover, the operations may be performed by more, fewer, or other components. Additionally, the operations may be performed using any suitable logic comprising software, hardware, and/or other logic.

II. Image Quality Assessment and Processing

Figure 3:
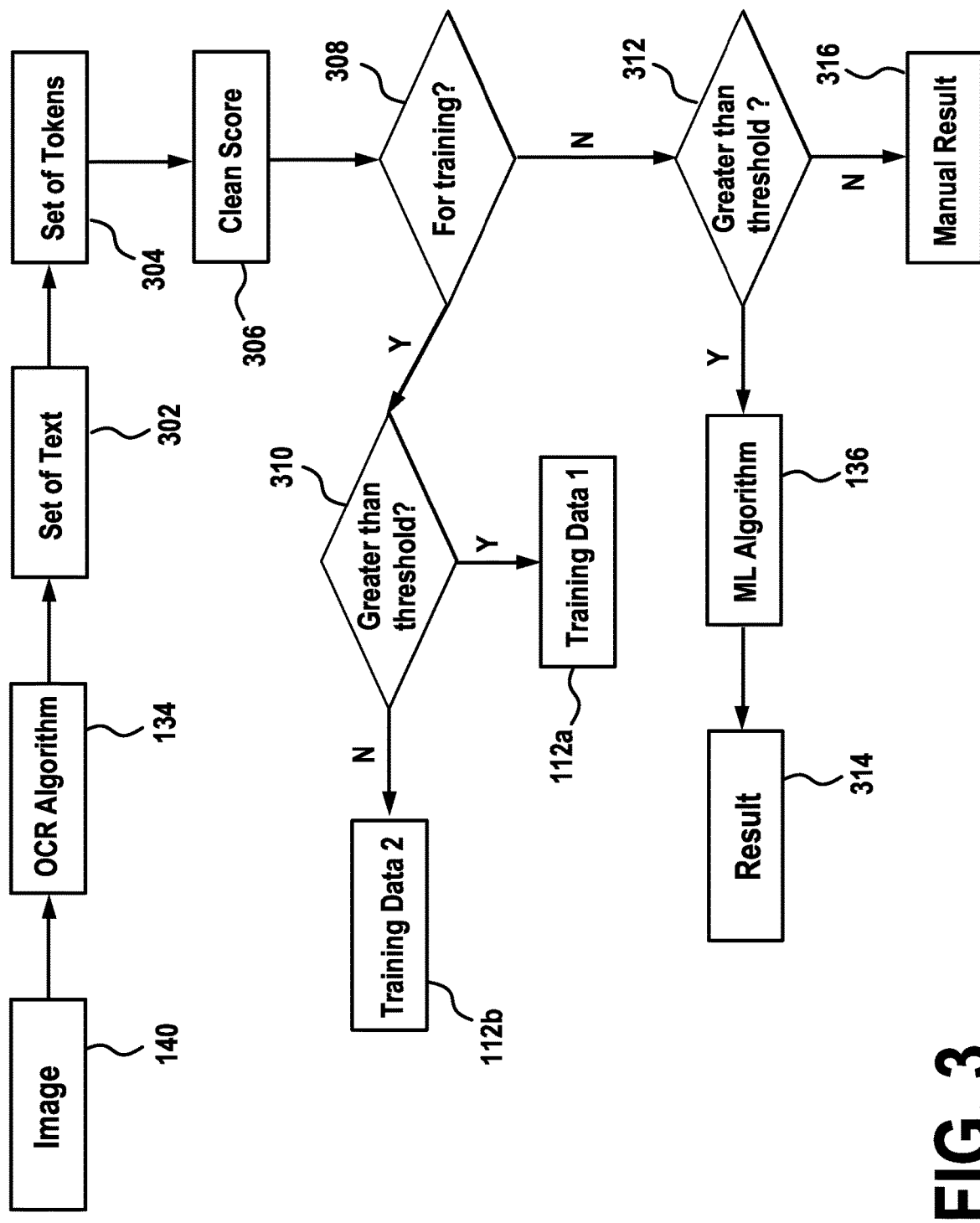
FIG. 3 illustrates an example of the manner by which the document processing tool of the system presented in FIG. 1 assesses the quality of an image of a physical document, and uses the assessment to process the image.

FIG. 3 presents an example illustrating the manner by which document processing tool 102 processes an image 140 of a page of a physical document. Document processing tool 102 is configured to receive one or more images 140, each of which corresponds to an electronic image (e.g., a scan, a photograph, etc.) of a page of a physical document. An example image 140 is presented in FIG. 2A. In certain embodiments, document processing tool 102 is configured to receive these images 140 over time, as a stream of images 140. For example, document processing tool 102 may receive each image 140 in a separate transmission from a scanner. In some embodiments, document processing tool 102 is configured to receive multiple images 140 at once. For example, document processing tool 102 may receive multiple images 140 that were included in an email attachment transmitted by user 104.

As illustrated in FIG. 3, after receiving image 140, document processing tool 102 applies OCR algorithm 134 to the image, to convert the text depicted in the image into a set of machine-readable text 302. An example of the set of text 302 that may be produced by OCR algorithm 134 is presented in FIG. 2B, for the image depicted in FIG. 2A. As illustrated by FIGS. 2A and 2B, OCR algorithm 134 may perform poorly on low quality images 140.

After generating set of text 302, document processing tool 102 generates a set of tokens 304 from the set of text 302. Each token of the set of tokens 304 corresponds to a set of one or more contiguous characters delimited by whitespace. As an example, for a set of text 302 of the form: "On 3/12/2021 at 2:23 PM, $123.45 was received.", document processing tool 102 may split the text into the following set of tokens 304: {On; 3/12/2021; at; 2:23; PM; $123.45; was; received.}. Document processing tool 102 then generates clean score 306 based on the set of tokens 304. This disclosure contemplates that clean score 306 is any measure of the quality of image 140 that is obtained based on a measure (which, in certain embodiments, may be an approximate measure) of the accuracy of the text 302 generated by applying OCR algorithm 134 to image 140. As an example, in certain embodiments, clean score 306 is generated from set of tokens 304 as follows. First, document quality tool 102 determines the total number of tokens that are included in set of tokens 304. Next, document processing tool 102 removes any valid punctuation marks from each token. For example, document processing tool 102 may remove any sequence of one or more contiguous punctuation marks from the beginning and/or end of any token for which such punctuation marks are present. For instance, in the above example in which set of tokens 304 includes: {On; 3/12/2021; at; 2:23; PM; $123.45; was; received.}, document processing tool 102 may remove the comma from the "PM," token, and the period from the "received." token. Punctuation marks may include periods, commas, colons, semi-colons, question marks, exclamation marks, quotation marks, brackets, and/or any other suitable mark that may be expected to be found before and/or after a valid set of characters in a document. After removing any valid punctuation marks from each token of the set of tokens 304, document processing tool 102 may perform one or more of the following set of operations: (1) remove any tokens of the set of tokens 304 that correspond to integers, dollar amounts, negative dollar amounts, and/or any other suitable types of numbers that may be present within the text depicted in image 140; (2) remove any tokens of the set of tokens 304 that correspond to percentages (e.g., end with the "%" symbol); (3) remove any tokens of the set of tokens 304 that are formatted according to one or more date formats (e.g., dd/mm/yy, dd/mm/yyyy, dd-mm-yyyy, dd-mm-yy, etc.) and/or time formats (e.g., hh:mm, hh:mm:ss, etc.); (4) remove any tokens of the set of tokens 304 that correspond to words included in dictionary 138; (5) remove any tokens of the set of tokens 304 that correspond to valid 1-character tokens (e.g., "&"), and/or (6) remove any other tokens of the set of tokens 304 that may correspond to valid sequences of characters that may be found in the document corresponding to image 140. In certain embodiments in which each word of dictionary 138 is stored in memory 132 at a memory address corresponding to the value (e.g., hash value) of a function (e.g., a hash function) applied to the word, document processing tool 102 determines that a token corresponds to a word included in dictionary 138 by applying the function (e.g., the hash function) to the token to generate a memory address, and then comparing the content stored at the memory address to the token. If the content stored at the memory address matches the token, document processing tool 102 determines that the token corresponds to a word of dictionary 138. If the content stored at the memory address does not match the token, document processing tool 102 determines that the token does not correspond to a word of dictionary 138. After performing the above-described steps, document processing tool 102 next determines the number of tokens remaining in the set of tokens 304. These remaining tokens are assumed to be invalid (e.g., erroneous) tokens that were generated as a result of noise in image 140. Document processing tool 102 next calculates the clean score using the following equation: (total number of tokens−number of remaining tokens)/total number of tokens. The resulting clean score falls in the range from 0 to 1 and gives an indication of how clean and readable set of text 302 is. For example, in certain embodiments, a clean score of 0.75 for image 140 means that 25% of the tokens in the set of tokens 302 generated from image 140 are erroneous non-valid words, stray characters, and/or stray punctuations.

After generating clean score 306, in certain embodiments, document processing tool 102 next performs step 308, in which the tool determines whether image 140 and/or set of text 302 is to be used to train a machine learning algorithm 136. If document processing tool 102 determines that image 140 and/or set of text 302 is to be used to train a machine learning algorithm 136, document processing tool 102 next performs comparison 310, in which document processing tool 102 determines whether clean score 306 is greater than a given threshold. The threshold may correspond to any number within the range of possible clean scores. In certain embodiments, the threshold may be set by administrator 126 and/or user 104. In some embodiments, the threshold may be adjustable. As an example, in certain embodiments, a different threshold may be used depending on the type of machine learning algorithm 136 that image 140 and/or set of text 302 is to be used to train. For instance, in certain embodiments, the threshold may be chosen such that, when trained on sets of text 302 of at least the threshold clean score, the machine learning algorithm 136 demonstrates at least a minimum accuracy level. In some embodiments, comparison 310 may include comparisons to more than one threshold. For example, in certain embodiments, document processing tool 102 may be configured to train a pair of machine learning algorithms—a first machine learning algorithm 136a that is designed for use with high quality images 140, and a second machine learning algorithm 136b that is designed for use with low quality images 140. In such embodiments, clean score 306 may be compared against a first threshold to identify high quality images 140/sets of text 302 that are suitable for training the first machine learning algorithm 136a. For low quality images 140/sets of text 302 (e.g., those with clean scores 306 below the first threshold), the clean score 306 may additionally be compared against a second, lower threshold, to identify low quality images 140/sets of text 302 that are nevertheless suitable for training the second machine learning algorithm 136b. For example, the second threshold may be chosen such that, when trained on images 140/sets of text 302 for which clean score 306 is greater than the second threshold, machine learning algorithm 136 demonstrates at least a given level of accuracy. As illustrated in FIG. 3, in response to determining that clean score 306 is greater than the threshold, the corresponding image 140/set of text 302 is stored in first set of training data 112a. On the other hand, in response to determining that clean score 306 is below the threshold (and, in certain embodiments, above a second threshold), the corresponding image 140/set of text 302 is stored in second set of training data 112b.

In some embodiments, document processing tool 102 only stores image 140/set of text 302 in training data 112 if clean score 306 is greater than the threshold. In certain embodiments, document processing tool 102 does not perform step 308 or comparison 310, but rather proceeds directly to comparison 312, in response to generating clean score 306.

During comparison 312, document processing tool 102 determines whether image 140/set of text 302 is suitable for automatic processing based on clean score 306. In particular, document processing tool 102 determines whether image 140/set of text 302 is suitable for automatic processing based on a comparison a given threshold. This threshold may be the same or different from the threshold(s) considered in comparison 310, and may correspond to any number within the range of possible clean scores. In certain embodiments, the threshold may be set by administrator 126 and/or user 104. In some embodiments, the threshold may be adjustable. For example, a different threshold may be used depending on the manner in which document processing tool 102 is configured to process image 140 and/or set of text 302. For instance, in certain embodiments, the threshold may be chosen such that the trained machine learning algorithm 136 demonstrates at least a minimum accuracy level when applied to images 140 and/or sets of text 302 of at least the threshold clean score.

In response to determining, through comparison 312, that the clean score 306 is greater than the threshold, document processing tool 102 automatically processes image 140/set of text 302. For example, in certain embodiments, document processing tool 102 may apply one or more machine learning algorithms 136 to set of text 302. Machine learning algorithms 136 may be any suitable machine learning algorithm. For example, machine learning algorithm 136a may be a classification algorithm that is used to assign image 140 to a category of a set of categories. As another example, machine learning algorithm 136b may be an algorithm configured to extract certain information from image 140/set of text 302. While FIG. 3 illustrates the use of a machine learning algorithm 136, this disclosure contemplates that document processing tool 102 may be configured to automatically apply any suitable algorithm to image 140/set of text 302, in response to comparing clean score 306 to the threshold.

In response to applying machine learning algorithm 136 to set of text 302, document processing tool 102 is configured to process the result 314 generated by machine learning algorithm 136. As an example, in certain embodiments, document processing tool 102 may store image 140 and/or set of text 302 in database 118, based on result 314. For instance, in certain embodiments in which machine learning algorithm 136 is a classification machine learning algorithm, document processing tool 102 may store image 140 as a classified document 120 (and/or a page 122 of a classified document 120) at a particular location within database 118, based on the classification. As another example, in certain embodiments, document processing tool 102 may store result 314, and/or data generated based on result 314 in database 118. For instance, in certain embodiments in which machine learning algorithm 136 is configured to extract certain information from image 140/set of text 302, document processing tool 102 may store the extracted information in database 118.

In response to determining, during comparison 312, that clean score is less than the given threshold, document processing tool 102 may transmit image 140/set of text 302 to system administrator 126 for manual processing. For example, system administrator 126 may manually classify the image 140/set of text 302 into a category of a set of categories, manually extract certain information from the image 140/set of text 302, and/or perform any other suitable manual processing. In certain embodiments, document processing tool 102 is configured to receive a result 316 from the system administrator, based on this information, and process the result. For example, in certain embodiments in which result 316 corresponds to a manual classification of image 140/set of text 302, document processing tool 102 may be configured to store image 140/set of text 302 in database 118, based on result 316, in a similar manner as described above, for the situation in which machine learning algorithm 136 generates an automatic classification. In some embodiments in which result 316 corresponds to information that was extracted from image 140/set of text 302 by administrator 126, document processing tool 102 is configured to store the information in database 118, in a similar manner as described above, for the situation in which machine learning algorithm 136 automatically extracts the information.

While FIG. 3 illustrates document processing tool 102 receiving a manual result 316 from a system administrator 126, in response to determining that clean score 306 is below a given threshold, in certain embodiments, document processing tool 102 does not transmit image 140/set of text 302 to system administrator 126 for automatic processing, in response to determining that clean score 306 is less than the threshold. In some embodiments, document processing tool 102 transmits a rejection message 142 to user 104, informing the user that image 140 is not of a suitable quality for acceptance by the tool. In such embodiments, in response to receiving rejection 142, user 104 may transmit a new image 140 to document processing tool 102, corresponding to a new, higher quality image of the same document as the original, low-quality image 140.

Figure 4:
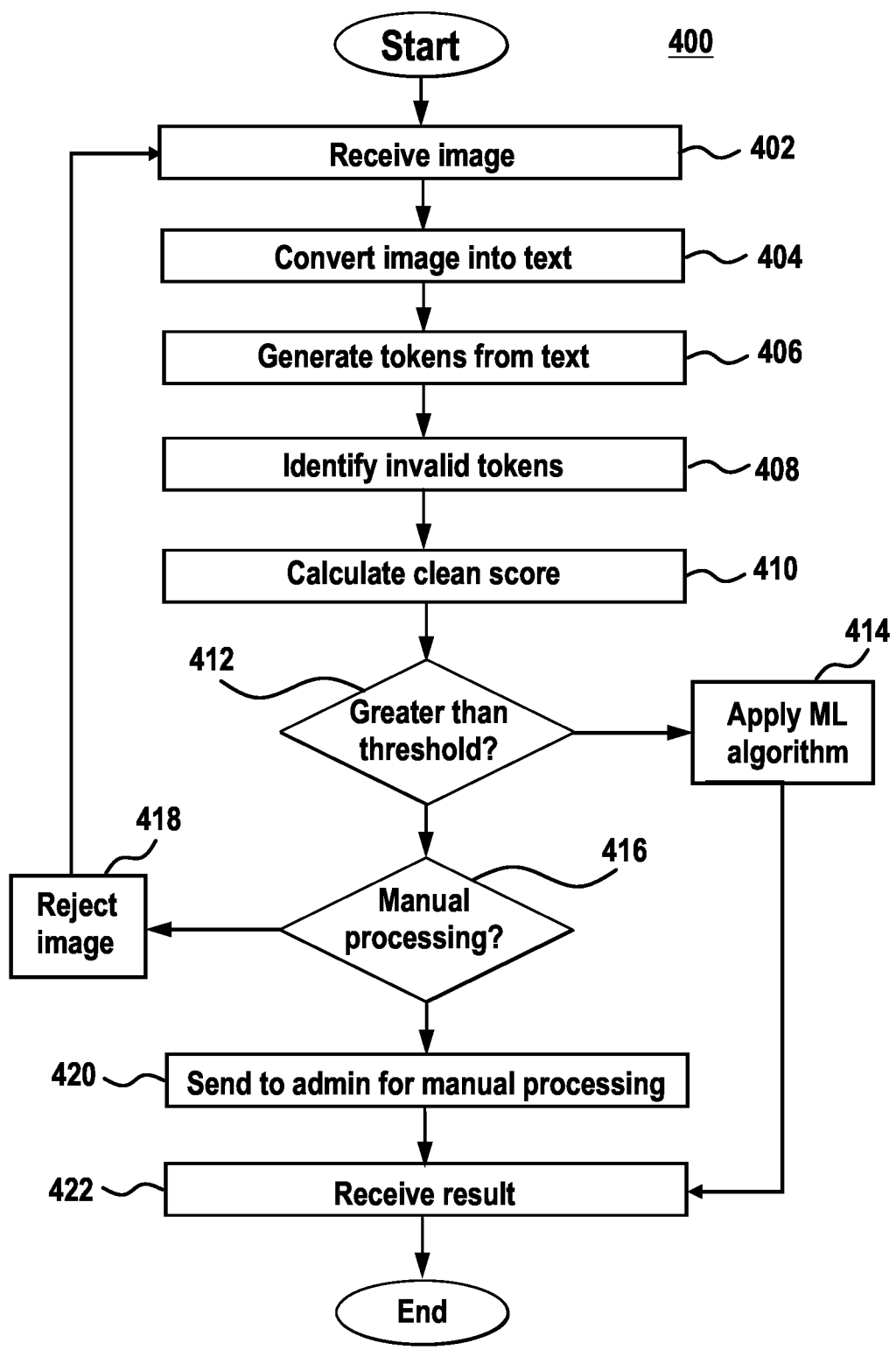
FIG. 4 presents a flowchart illustrating an example process by which the document processing tool of the system presented in FIG. 1 receives electronic images of pages of physical documents, assesses the quality of the images, and processes the images based on their assessed qualities.

III. Method for Assessing Image Quality, and Processing Images Based on the Assessment FIG. 4 presents a flowchart (described in conjunction with elements of FIGS. 1 and 3) illustrating an example method 400 by which document processing tool 102 receives electronic images 140 of pages of physical documents, calculates clean scores 306 for the images, and processes the images based on the calculated clean scores.

In step 402 document processing tool 102 receives image 140. In step 404 document processing tool 102 applies OCR algorithm 132 to image 140, to generate set of text 302. In step 406 document processing tool 102 generates a set of tokens 304 from the set of text 302, by identifying sets of contiguous characters delimited by whitespace within set of text 302. In step 408 document processing tool 102 identifies the invalid tokens within the set of tokens 304, by removing valid tokens from set of tokens 304, as described above, in the discussion of FIG. 3. In step 410 document processing tool 102 calculates clean score 306 as the ratio of the number of valid tokens within set of tokens 304 (calculated as the total number of tokens within set of tokens 304 minus the number of invalid tokens within set of tokens 304) to the total number of tokens within set of tokens 304. In step 412 document processing tool 102 determines whether clean score 306 is greater than a threshold. If, in step 412 the tool determines that the clean score is greater than the threshold, in step 414 document processing tool 102 applies one or more machine learning algorithms 136 to image 140 and/or set of text 302, to generate a result.

On the other hand, if, in step 412 the tool determines that the clean score is not greater than the threshold, in step 416 document processing tool 102 determines whether image 140 and/or set of text 302 are to be sent to system administrator 126 for manual processing. In certain embodiments, document processing tool 102 may be configured to send image 140 and/or set of text 302 to administrator 126 for manual processing whenever clean score 306 is less than the threshold. In some embodiments, document processing tool 102 may not be configured to send image 140 and/or set of text 302 to administrator 126 for manual processing when clean score 306 in less than the threshold. Instead, document processing tool 102 may be configured to send rejection 142 to user 104 whenever clean score 306 is less than the threshold. In some embodiments, document processing tool 102 may be configured to send image 140 and/or set of text 302 to administrator 126 for manual processing when clean score 306 is less than the threshold, but above a lower threshold, and to send rejection 142 to user 104 when clean score 306 is less than both thresholds.

If, in step 416 data quality assessment tool 102 determines to send image 140 and/or set of text 302 to system administrator 126 for manual processing, in step 420 the tool sends image 140/set of text 302 to the administrator. In step 422 document processing tool 102 receives a result from the processing of the image/set of text. The result may have been generated automatically by machine learning algorithm 136 or received from device 128 of system administrator 126 after manual processing.

If, in step 416 data quality assessment tool 102 determines to reject image 140, in step 418 the tool sends rejection 142 to user 104. Method 400 then returns to step 402, where document processing tool 102 may receive a new image 140 from user 104, corresponding to a higher-quality version of the original image 140.

Modifications, additions, or omissions may be made to method 400 depicted in FIG. 4. Method 400 may include more, fewer, or other steps. For example, steps may be performed in parallel or in any suitable order. While discussed as document processing tool 102 (or components thereof) performing the steps, any suitable component of system 100, such as user device(s) 106 and/or administrator device(s) 128 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. An apparatus comprising:
a memory configured to store:
an optical character recognition (OCR) algorithm;
a first machine learning algorithm trained to classify a set of text into a category of a set of categories; and
a dictionary of words; and
a hardware processor communicatively coupled to the memory, the hardware processor configured to:
receive a first image of a page of a physical document;
convert, by executing the OCR algorithm, the first image into a first set of text comprising characters and whitespaces;
identify a plurality of tokens within the first set of text, each token of the plurality of tokens comprising one or more contiguous characters, wherein the one or more contiguous characters are preceded by whitespace and followed by whitespace within the first set of text;
for each token of the plurality of tokens, remove any valid punctuation from the token, wherein the valid punctuation comprises at least one of:
one or more contiguous punctuation marks at a beginning of the token; and
one or more contiguous punctuation marks at an end of the token;
identify a set of invalid tokens from the plurality of tokens, wherein identifying the set of invalid tokens comprises removing each token of the plurality of tokens that corresponds to a word of the dictionary of words;
determine, based on a total number of invalid tokens of the set of invalid tokens and a total number of tokens of the plurality of tokens, a total number of valid tokens of the plurality of tokens;
calculate, based on a ratio of the total number of valid tokens to the total number of tokens of the plurality of tokens, a score for the first set of text;
determine that the score for the first set of text is greater than a threshold; and
in response to determining that the score for the first set of text is greater than the threshold:
apply the first machine learning algorithm to the first set of text to classify the first set of text into a first category of the set of categories; and
store, according to the first category, at least one of the first image and the first set of text in a database.

2. The apparatus of claim 1, wherein the dictionary of words comprises:
a set of words obtained from one or more dictionaries; and
a set of abbreviations.

3. The apparatus of claim 1, wherein the hardware processor is further configured to:

receive a second image of a page of a second physical document;

convert, by executing the OCR algorithm, the second image into a second set of text comprising characters and whitespaces;

identify a second plurality of tokens within the second set of text, each token of the second plurality of tokens comprising one or more contiguous characters, wherein the one or more contiguous characters are preceded by whitespace and followed by whitespace within the second set of text;

for each token of the second plurality of tokens, remove any of the valid punctuation from the token;

identify a second set of invalid tokens from the second plurality of tokens, wherein identifying the second set of invalid tokens comprises removing each token of the second plurality of tokens that corresponds to a word of the dictionary of words;

calculate, based on a ratio of a total number of invalid tokens of the second set of invalid tokens to a total number of tokens of the second plurality of tokens, a score for the second set of text;

determine that the score for the second set of text is less than the threshold; and in response to determining that the score for the second set of text is less than the threshold, determine not apply the first machine learning algorithm to the second set of text.

4. The apparatus of claim 3, wherein, in response to determining that the score for the second set of text is less than the threshold, the hardware processor is further configured to:

transmit the second image to a device of an administrator;

receive, from the device of the administrator, an identification of a second category of the set of categories into which the second image was manually classified; and store the second image in the database according to the second category.

5. The apparatus of claim 3, wherein:

the memory is further configured to store a second machine learning algorithm that was trained using a different training set than the first machine learning algorithm; and in response to determining that the score for the second set of text is less than the threshold, the hardware processor is further configured to:

apply the second machine learning algorithm to the second set of text, to classify the second set of text into a second category of the set of categories; and store, according to the second category, the second image in the database.

6. The apparatus of claim 3, wherein:

the second image was received from a device of a user; and in response to determining that the score for the second set of text is less than the threshold, the hardware processor is further configured to:

transmit a message to the device of the user, the message notifying the user that the second image was rejected; and in response to transmitting the message to the device of the user, receive a new image of the page of the second physical document from the user.

7. The apparatus of claim 1, wherein identifying the set of invalid tokens further comprises:

removing each token of the plurality of tokens that corresponds to a date; and removing each token of the plurality of tokens that corresponds to at least one of an integer value, a dollar amount, and a percentage amount.

8. A method comprising:

receiving a first image of a page of a physical document;

converting, by executing an optical character recognition (OCR) algorithm, the first image into a first set of text comprising characters and whitespaces;

identifying a plurality of tokens within the first set of text, each token of the plurality of tokens comprising one or more contiguous characters, wherein the one or more contiguous characters are preceded by whitespace and followed by whitespace within the first set of text;

for each token of the plurality of tokens, removing any valid punctuation from the token, wherein the valid punctuation comprises at least one of:

one or more contiguous punctuation marks at a beginning of the token; and one or more contiguous punctuation marks at an end of the token;

identifying a set of invalid tokens from the plurality of tokens, wherein identifying the set of invalid tokens comprises removing each token of the plurality of tokens that corresponds to a word of a dictionary of words;

determining, based on a total number of invalid tokens of the set of invalid tokens and a total number of tokens of the plurality of tokens, a total number of valid tokens of the plurality of tokens;

calculating, based on a ratio of the total number of valid tokens to the total number of tokens of the plurality of tokens, a score for the first set of text;

determining that the score for the first set of text is greater than a threshold; and in response to determining that the score for the first set of text is greater than the threshold:

applying a first machine learning algorithm to the first set of text, the first machine learning algorithm trained, based on a set of training data, to classify the first set of text into a first category of a set of categories; and storing, according to the first category, at least one of the first image and the first set of text in a database.

9. The method of claim 8, wherein the dictionary of words comprises:

a set of words obtained from one or more dictionaries; and a set of abbreviations.

10. The method of claim 8, further comprising:

receiving a second image of a page of a second physical document;

converting, by executing the OCR algorithm, the second image into a second set of text comprising characters and whitespaces;

identifying a second plurality of tokens within the second set of text, each token of the second plurality of tokens comprising one or more contiguous characters, wherein the one or more contiguous characters are preceded by whitespace and followed by whitespace within the second set of text;

for each token of the second plurality of tokens, removing any of the valid punctuation from the token;

identifying a second set of invalid tokens from the second plurality of tokens, wherein identifying the second set of invalid tokens comprises removing each token of the second plurality of tokens that corresponds to a word of the dictionary of words;

calculating, based on a ratio of a total number of invalid tokens of the second set of invalid tokens to a total number of tokens of the second plurality of tokens, a score for the second set of text;

determining that the score for the second set of text is less than the threshold; and in response to determining that the score for the second set of text is less than the threshold, determining not to apply the first machine learning algorithm to the second set of text.

11. The method of claim 10, wherein, in response to determining that the score for the second set of text is less than the threshold, the method further comprises:

transmitting the second image to a device of an administrator;

receiving, from the device of the administrator, an identification of a second category of the set of categories into which the second image was manually classified; and storing the second image in the database according to the second category.

12. The method of claim 10, further comprising:

the memory is further configured to store a second machine learning algorithm that was trained using a different training set than the first machine learning algorithm; and in response to determining that the score for the second set of text is less than the threshold:

applying a second machine learning algorithm to the second set of text, the second machine learning algorithm trained, based on a second set of training data different from the first set of training data, to classify the second set of text into a second category of the set of categories; and storing, according to the second category, the second image in the database.

13. The method of claim 10, wherein: the second image was received from a device of a user; and in response to determining that the score for the second set of text is less than the threshold, the method further comprises: transmitting a message to the device of the user, the message notifying the user that the second image was rejected; and in response to transmitting the message to the device of the user, receiving a new image of the page of the second physical document from the user.

14. The method of claim 8, wherein identifying the set of invalid tokens further comprises:

removing each token of the plurality of tokens that corresponds to a date; and removing each token of the plurality of tokens that corresponds to at least one of an integer value, a dollar amount, and a percentage amount.

15. An apparatus, comprising:

a memory configured to store:

an optical character recognition (OCR) algorithm;

a first machine learning algorithm trained to extract information from a set of text; and a dictionary of words; and a hardware processor communicatively coupled to the memory, the hardware processor configured to:

receive a first image of a page of a physical document;

convert, by executing the OCR algorithm, the first image into a first set of text comprising characters and whitespaces;

identify a plurality of tokens within the first set of text, each token of the plurality of tokens comprising one or more contiguous characters, wherein the one or more contiguous characters are preceded by whitespace and followed by whitespace within the first set of text;

for each token of the plurality of tokens, remove any valid punctuation from the token, wherein the valid punctuation comprises at least one of:

one or more contiguous punctuation marks at a beginning of the token; and one or more contiguous punctuation marks at an end of the token;

identify a set of invalid tokens from the plurality of tokens, wherein identifying the set of invalid tokens comprises removing each token of the plurality of tokens that corresponds to a word of the dictionary of words;

determine, based on a total number of invalid tokens of the set of invalid tokens and a total number of tokens of the plurality of tokens, a total number of valid tokens of the plurality of tokens;

calculate, based on a ratio of the total number of valid tokens to the total number of tokens of the plurality of tokens, a score for the first set of text;

determine that the score for the first set of text is greater than a threshold; and in response to determining that the score for the first set of text is greater than the threshold:

apply the first machine learning algorithm to the first set of text to extract a first set of information from the first set of text; and store at least one of the first set of information and information generated using the first set of information in a database.

16. The apparatus of claim 15, wherein the dictionary of words comprises:

a set of words obtained from one or more dictionaries; and a set of abbreviations.

17. The apparatus of claim 15, wherein the hardware processor is further configured to:

receive a second image of a page of a second physical document;

convert, by executing the OCR algorithm, the second image into a second set of text comprising characters and whitespaces;

identify a second plurality of tokens within the second set of text, each token of the second plurality of tokens comprising one or more contiguous characters, wherein the one or more contiguous characters are preceded by whitespace and followed by whitespace within the second set of text;

for each token of the second plurality of tokens, remove any of the valid punctuation from the token;

identify a second set of invalid tokens from the second plurality of tokens, wherein identifying the second set of invalid tokens comprises removing each token of the second plurality of tokens that corresponds to a word of the dictionary of words;

calculate, based on a ratio of a total number of invalid tokens of the second set of invalid tokens to a total number of tokens of the second plurality of tokens, a score for the second set of text;

determine that the score for the second set of text is less than the threshold; and in response to determining that the score for the second set of text is less than the threshold, determine not apply the first machine learning algorithm to the second set of text.

18. The apparatus of claim 17, wherein, in response to determining that the score for the second set of text is less than the threshold, the hardware processor is further configured to:
transmit the second image to a device of an administrator;
receive, from the device of the administrator, a second set of information that was manually extracted from the second image; and
store at least one of the second set of information and information generated using the second set of information in the database.

19. The apparatus of claim 17, wherein:
the memory is further configured to store a second machine learning algorithm that was trained using a different training set than the first machine learning algorithm; and
in response to determining that the score for the second set of text is less than the threshold, the hardware processor is further configured to:
apply the second machine learning algorithm to the second set of text, to extract a second set of information from the second set of text; and
store at least one of the second set of information and information generated using the second set of information in a database.

20. The apparatus of claim 17, wherein:
the second image was received from a device of a user; and
in response to determining that the score for the second set of text is less than the threshold, the hardware processor is further configured to:
transmit a message to the device of the user, the message notifying the user that the second image was rejected; and
in response to transmitting the message to the device of the user, receive a new image of the page of the second physical document from the user.

* * * * *